(12) United States Patent
Seto et al.

(10) Patent No.: US 7,355,618 B2
(45) Date of Patent: Apr. 8, 2008

(54) IMAGE EXPOSURE APPARATUS

(75) Inventors: Mikiya Seto, Wakayama (JP); Kazuhiro Yoshida, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 259 days.

(21) Appl. No.: 10/892,128

(22) Filed: Jul. 16, 2004

(65) Prior Publication Data
US 2005/0024476 A1 Feb. 3, 2005

(30) Foreign Application Priority Data
Jul. 18, 2003 (JP) ............................. 2003-276556

(51) Int. Cl.
*B41J 2/47* (2006.01)
*G01D 15/14* (2006.01)
(52) U.S. Cl. .................. 347/255; 347/239; 347/225
(58) Field of Classification Search ................ 347/238, 347/239, 225, 255
See application file for complete search history.

(56) References Cited

U.S. PATENT DOCUMENTS

| 5,754,214 | A | * | 5/1998 | Okino | 347/229 |
|---|---|---|---|---|---|
| 5,777,659 | A | * | 7/1998 | Genovese | 347/252 |
| 5,943,082 | A | * | 8/1999 | Uchiyama et al. | 347/156 |
| 6,169,562 | B1 | * | 1/2001 | Morimoto | 347/232 |
| 6,285,389 | B1 | * | 9/2001 | Genovese | 347/250 |
| 6,466,594 | B1 | * | 10/2002 | Iwazaki | 372/29.01 |
| 6,552,741 | B2 | * | 4/2003 | Nakahara et al. | 347/239 |
| 2002/0158965 | A1 | * | 10/2002 | Ema | 347/250 |

FOREIGN PATENT DOCUMENTS

JP 5-199372 A 8/1993

\* cited by examiner

*Primary Examiner*—Stephen Meier
*Assistant Examiner*—Sarah Al-Hashimi
(74) *Attorney, Agent, or Firm*—Smith Patent Office

(57) ABSTRACT

An image exposure apparatus of a different angle incident type is provided having a single optical sensor unit for determining the timing for start point synchronization along the main scanning direction, an output level detecting device determining the output level of each beam of light which can be detected by the optical sensor unit, a first modulating device modulating the output level of each beam of light with a pixel data in the light path for exposure, and a second modulating device modulating the output level of each beam of light to a higher level outside of the light path for exposure than the level determined by said output level detecting device.

2 Claims, 10 Drawing Sheets

IMAGE EXPOSURE APPARATUS

BACKGROUND OF THE INVENTION

1. Field of the Invention

The present invention relates to an image exposure apparatus with a different angle incident light optical system which comprises a plurality of light sources for emitting light beams of different narrow band wavelengths at different angles respectively, a deflection optical system for receiving on its same reflecting surface and reflecting the light beams in the main scanning direction to scan a photosensitive material at predetermined intervals along the scanning lines for exposure, and a single optical sensor unit located outside of the light path for exposure extending from the deflection optical system to the photosensitive material for providing the timing of start point synchronization for exposure actions along the main scanning direction.

2. Description of the Related Art

Digital image exposure apparatuses have been proposed for actual use where a group of light beams of red, green, and blue narrow band wavelengths modulated by pixel data of, e.g., each digital color image which has been received from a film scanner scanning a photographic film or shot by a digital camera and saved in a memory are directed to and fallen on a photosensitive material such as a color printed sheet of which the spectral sensitivity depends on the wavelengths of exposure light for recording and reproducing the color image.

The digital image exposure apparatuses employ commonly a scanning exposure technique for exposing the photosensitive material, which is conveyed in a sub scanning direction oriented at a right angle to the main scanning direction, to the light beams deflected to scan along the main scanning direction.

It is essential for the exposure scanning on the color photosensitive material to scan the light beams of different narrow band wavelengths in blue (B), green (G), and red (R) colors along the main scanning line on the photosensitive material as precisely as possible for printing the three primary colors; yellow (Y), magenta (M), and cyan (C). In practice, as shown in FIG. 11, three light beams of R, G, and B colors emitted from their respective light sources 7R, 7G, and 7B are combined by the action of light combining prisms 54R, 54G, and 54B and then received by a deflection optical system 8 for exposure of the photosensitive material. Although being used widely, this method however requires a set of fairly expensive optical components for combining the light beams and increases the number of the entire components to be assembled as yet having a limitation on the geometrical arrangement of the light sources and will hence be unfavorable for reduction of the overall size.

A type of the conventional image exposure apparatuses which is minimized in the production cost and the overall size is illustrated in FIG. 1 where light beams of blue (B), green (G), and red (R) colors emitted from the light sources 7R, 7G, and 7B such as light emitting diodes or semiconductor lasers are focused at different locations of the main scanning line on a photosensitive material with the use of a different angle incident optical system for scanning at predetermined intervals for exposure of the photosensitive material. This type requires the light beams to be timed for starting the exposure action on the photosensitive material or the timing of start point synchronization to be measured by optical sensor units respectively which are located outside of the light path for exposure, thus controlling the exposure timing of each light beam.

If the optical sensor units are provided corresponding to the three light beams, the number of the components will increase and thus interrupt the reduction of the overall size. For compensation, the use of a single optical sensor unit has been introduced. For producing the yellow (Y), the magenta (M), and the cyan (C), the corresponding light beams of blue (B), green (G), and red (R) are scanned at different intensities over the photosensitive material as shown in FIG. 9. This may however permit the single optical sensor unit, which has once been adjusted to a desired degree of the sensitivity, to successfully measure the red (R) of the light beam which is the highest in the intensity but fail to detect the green (G) and blue (B) which is lower in the intensity than the red (R). If any of the three light beams is not detected, the reproduction of an image will be unsuccessful.

As disclosed in Japanese Unexamined Patent Publication No. Hei-5-199372, a modification is proposed where a group of light sources are adapted for allowing the optical sensor unit to receive particular one of the light beams to be irradiated at the highest intensity precedent to the other color light beams. When all light beams are emitted at once from the light sources, their start point synchronization for exposure actions is initiated upon the optical sensor unit detecting the highest intensity of the light beam. More specifically, the start point synchronization for exposure actions of the beams of light over a photosensitive material is triggered by a detection signal of the optical sensor unit produced upon detecting the light beam of the highest intensity at the top.

The modification of the conventional technique disclosed in this invention is based on the notable fact that the duration from the optical sensor unit detecting the beam of light at the highest level to the arrival of each beam of light at the exposure start point on the photosensitive material is calculated from the distance between the location of the optical sensor unit and the exposure start point, the interval between the beams of light along the main scanning line determined by the location of the light sources, and the main scanning speed determined by the length of the light path and the rotating speed of the polygonal mirror in the deflection optical system. The timing for starting the exposure action with each beam of light is thus determined using a delay circuit which is provided for timing the arrival of the corresponding beam of light by delay after the optical sensor unit detects its start point detecting signal. However, this produces the following problems.

The light sources have to be positioned so that the beam of light at the highest intensity is first received by the optical sensor unit precedent to the other color beams of light. Accordingly, as the freedom for positioning the light sources is declined, the arrangement of design will hardly be flexible and favorable in the reduction of the overall size. When the light sources for emitting beams of light of narrow band wavelengths are embodied by laser devices, as shown in FIG. 6, the red color (R) of light at a higher output level is emitted from a semiconductor laser and the green (G) and blue (B) of light at lower output levels are emitted from SHG (second harmonic generation) laser devices in general. Those laser devices however are different in the package size and their positioning may largely affect the overall dimensions of the apparatus. Also, the size of a printer in which the conventional image exposure apparatus is installed will be reduced with much difficulty.

In practice, the delay time may be different between the setting and the actual length due to variations in the location of the light sources and the temperature characteristics of the modulating elements. If worse, the reproduced image will have color displacement. It is hence necessary to add the assembly process with an extra step for correcting any delay caused by machine differences.

Moreover, if the optical axis of any acousto-optic device employed for modulating the beam of light with a pixel data is slightly dislocated by the effect of temperature change or a mechanical impact, it will critically affect the exposure action. It is thus needed to constantly examine the beams of light for its correctness. On the contrary, this will unfavorably require an extra sensor unit for the examination in the conventional image exposure apparatus.

SUMMARY OF THE INVENTION

It is an object of the present invention, in view of the above-mentioned problems, to provide an image exposure apparatus with the different angle input optical system in which the arrangement of the light sources has a degree of design freedom so as to minimize the overall size and eliminate a troublesome adjusting step in the assembling process while the beams of light can successfully be detected without using a plurality of optical sensor units.

For achievement of above-mentioned object, an image exposure apparatus according to this invention comprises a group of light sources for emitting at different angles beams of light which are different in the narrow band wavelength from each other, the deflection optical system for reflecting and deflecting the beams of light received at one reflecting surface in the main scanning direction and scanning in a sequence at predetermined intervals along each scanning line for exposure of a photosensitive material, the single optical sensor unit located outside of the light path for exposure extending from said deflection optical system to the photosensitive material for providing the timing for start point synchronization along the main scanning direction, an output level detecting means for detecting the output level of each beam of light detectable with the optical sensor unit, a first modulating means for modulating the output level of each beam of light with a pixel data along the light path for exposure, and a second modulating means for modulating the output level of each beam of light to a higher level outside of the light path for exposure than a measurement of the output level detected by the output level detecting means.

Another image exposure apparatus according to this invention is provided comprising a group of light sources for emitting at different angles beams of light which are different in the narrow band wavelength from each other, the deflection optical system for reflecting and deflecting the beams of light received at one reflecting surface in the main scanning direction and scanning in a sequence at predetermined intervals along each scanning line for exposure of a photosensitive material, the optical sensor unit located outside of the light path for exposure extending from the deflection optical system to the photosensitive material for providing the timing for start point synchronization along the main scanning direction, a sensitivity setting means for setting the detection sensitivity of the optical sensor unit to a higher level than the minimum for detecting each beam of light at a reference level, the first modulating means for modulating the output level of each beam of light with a pixel data along the light path for exposure, and the second modulating means for modulating the output level of each beam of light to the reference level outside of the light path for exposure.

A further image exposure apparatus according to the present invention is provided comprising a group of light sources for emitting at different angles beams of light which are different in the narrow band wavelength from each other, the deflection optical system for reflecting and deflecting the beams of light received at one reflecting surface in the main scanning direction and scanning in a sequence at predetermined intervals along each scanning line for exposure of a photosensitive material, the optical sensor unit located outside of the light path for exposure extending from the deflection optical system to the photosensitive material for providing the timing for start point synchronization along the main scanning direction, the first modulating means for modulating the output level of each beam of light with a pixel data along the light path for exposure, the second modulating means for modulating the output level of each beam of light to a reference level outside of the light path for exposure, and a sensitivity setting means for setting the detection sensitivity of the optical sensor unit to a higher level than the minimum for detecting the reference output level of each beam of light during the operation of said second modulating means.

Other features of the present invention will be apparent from the following embodiments.

DETAILED DESCRIPTION OF THE PREFERRED EMBODIMENTS

Figure 2:
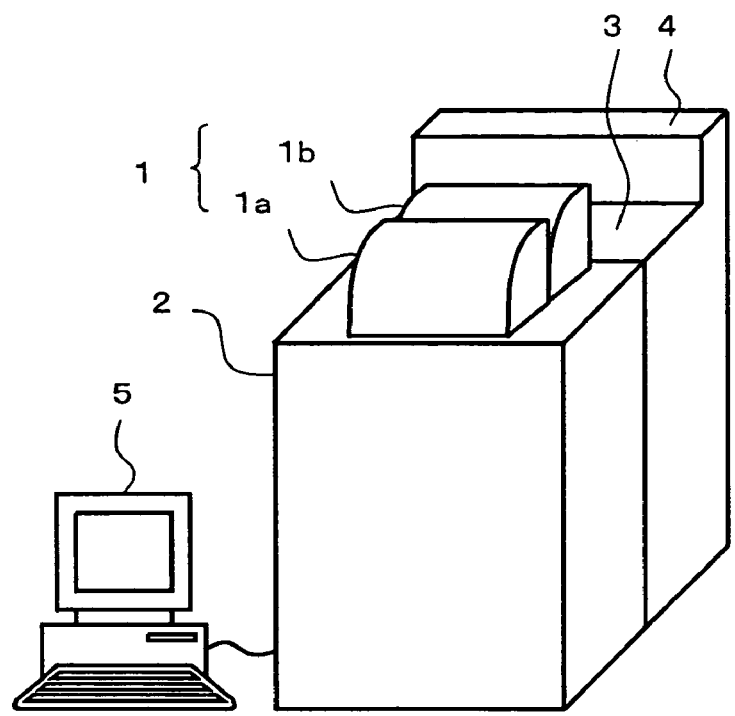
FIG. 2 is a schematic external view of a digital photographic printer where the image exposure apparatus of the present invention is installed.

The image exposure apparatus according to this invention will now be described referring the relevant drawings. As shown in FIG. 2, a digital photographic printer is provided comprising a printed paper storage 1 where rolls of printed paper such as photosensitive materials are stored for reproducing gradations of colors corresponding to the exposure intensities and the wavelengths of light, an image generating module 2 where an image exposure apparatus of the present invention is installed for exposing the printed paper received from said printed paper storage 1 to the beams of light scanning with image data of an original image, a development module 3 for subjecting the printed paper exposed to the beams of light in the image generating module 2 to development, breaching, and fixing steps as conveying it through vessels filled with liquid agents, a drying module 4 for drying the printed paper after the development process, and a computer 5 for carrying out steps of saving and editing the image data of the original image and supplying the image exposure apparatus with exposure data for the printed paper.

Figure 3:
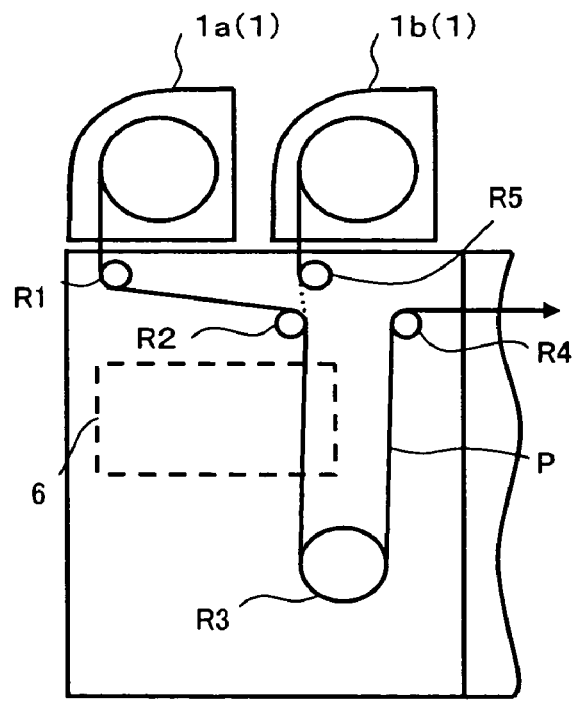
FIG. 3 is a schematic internal view of the digital photographic printer where the image exposure apparatus of the present invention is installed.

FIG. 3 illustrates the printed paper storage 1 mounted on the top of said image generating module 2 and consisting of two paper magazines 1a and 1b for storage of different size rolls of printed paper (photosensitive material) P. The printed paper P to be supplied can thus be switched between the two magazines depending on the size of an image output determined by the user. The image generating module 2, as mentioned above, includes a set of conveying rollers R1 to R5 for conveying the printed paper P released from the printed paper storage 1 and the image exposure apparatus 6 for exposing the printed paper P to the beams of light scanning.

Figure 1:
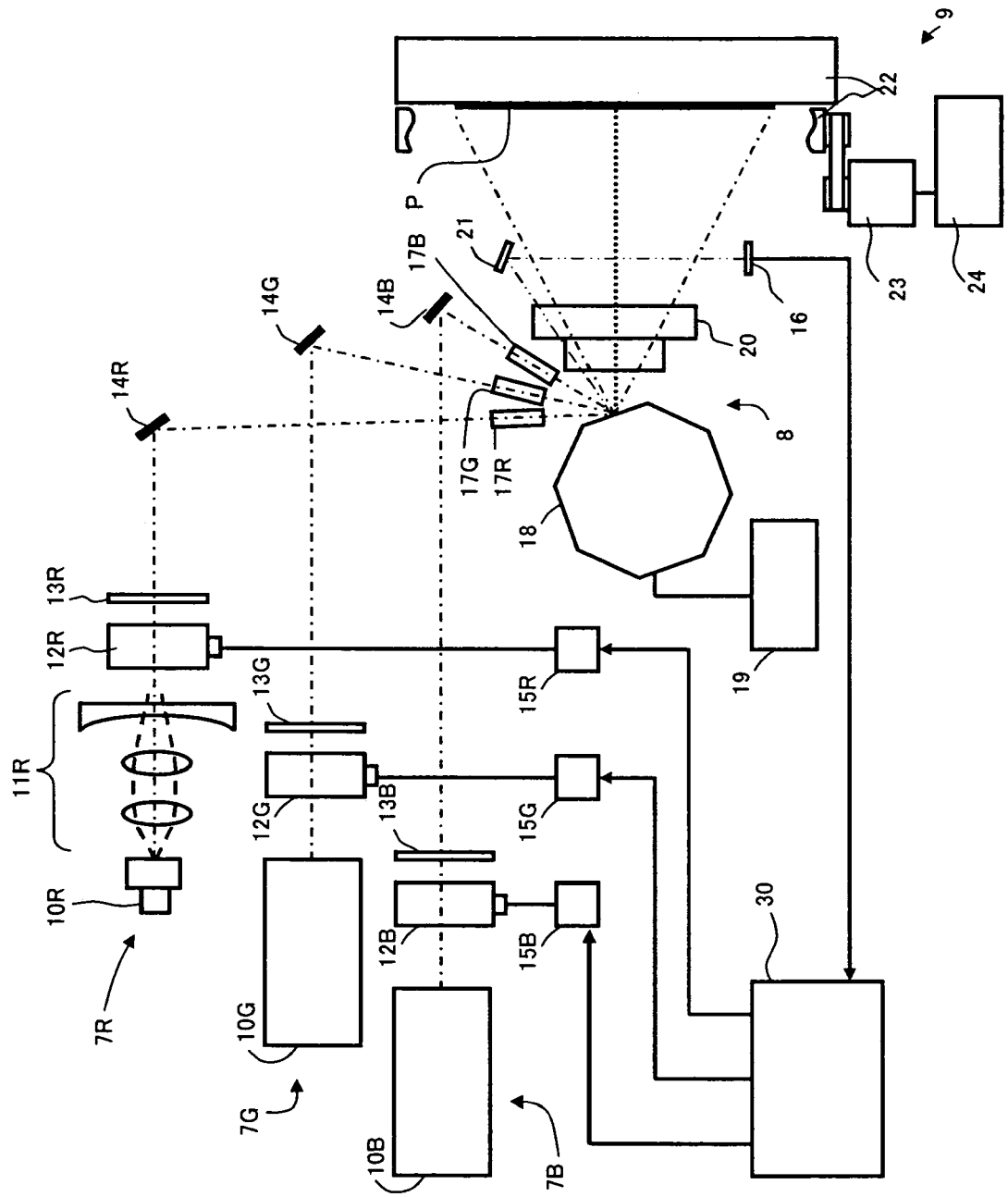
FIG. 1 is a block diagram of an image exposure apparatus according to the present invention.

As best shown in FIG. 1, the image exposure apparatus 6 comprises a group of light sources 7R, 7G, and 7B for emitting light beams of different narrow band wavelengths at different angles, a deflection optical system 8 for receiving on one reflecting surface and deflecting the light beams to scan in the main scanning direction on the printed paper P provided as a photosensitive material, a single optical sensor unit 16 located outside of the light path extending from the deflection optical system 8 to the printed paper P for determining the timing of start point synchronization for scanning the main scanning direction, and a controller 30.

The red color light source 7R comprises a red color laser diode 10R, a lens unit 11R, an acousto-optic modulator (referred to as an AOM hereinafter) 12R, and a dimmer 13R aligned in this order along the light axis and also includes a temperature adjusting unit and a control circuit for controlling the action of the red color laser diode 10R. The lens unit 11R is arranged for shaping the beam of light emitted from the red color laser diode 10R into a parallel beam which is then received by the input of the AOM 12R at the succeeding step.

The AOM 12R is an acousto-optic modulator using the effect of diffraction or acousto-optic diffraction where the refraction distribution derived from the distribution of densities created in a transparent medium by acoustic oscillation acts as a phase diffraction grating. When the ultrasonic wave to be applied is varied in the intensity, the intensity of diffracted light can be modified. This AOM 12R is connected with an AOM driver 15R. When receiving from this AOM driver 15R a high-frequency signal modulated in the amplitude by the image data, the AOM 12R allows an ultrasonic wave determined by the high-frequency signal to pass through its acousto-optic medium. When such laser beam runs through the acousto-optic medium, it is diffracted by the acousto-optic effect and can thus be released from the AOM 12R as a diffracted light of which the intensity corresponds to the amplitude of the high-frequency signal.

The dimmer 13R is arranged for adjusting the intensity of the laser beam modulated by the AOM 12R and, for example, may be embodied by an ND filter or a rotary disk having a number of different sized apertures therein. Since the light emitted at consistency from the light emitting element such as a semiconductor laser or a solid state laser is limited to a particular range, it is adjusted by the dimmer 13R to widen its dynamic range suitable for meeting the coloring characteristics of printed paper.

The green color light source 7G comprises a green color SHG (second harmonic generating) laser unit 10G, an AOM 12G, and a dimmer 13G aligned along the light axis and also includes the temperature adjusting unit and the control circuit. The green color SHG laser unit 10G may include a solid state laser such as YAG laser and a wavelength varying unit for extracting the second harmonic from the beam of laser emitted from the solid state laser. For example, when the beam of laser received from a YAG laser has a wavelength of 1064 nm, its second harmonic of 532 nm in the wavelength can be released. The green color SHG laser unit 10G further includes an optical system which provides the same function as of said lens unit 11R.

Figure 6:
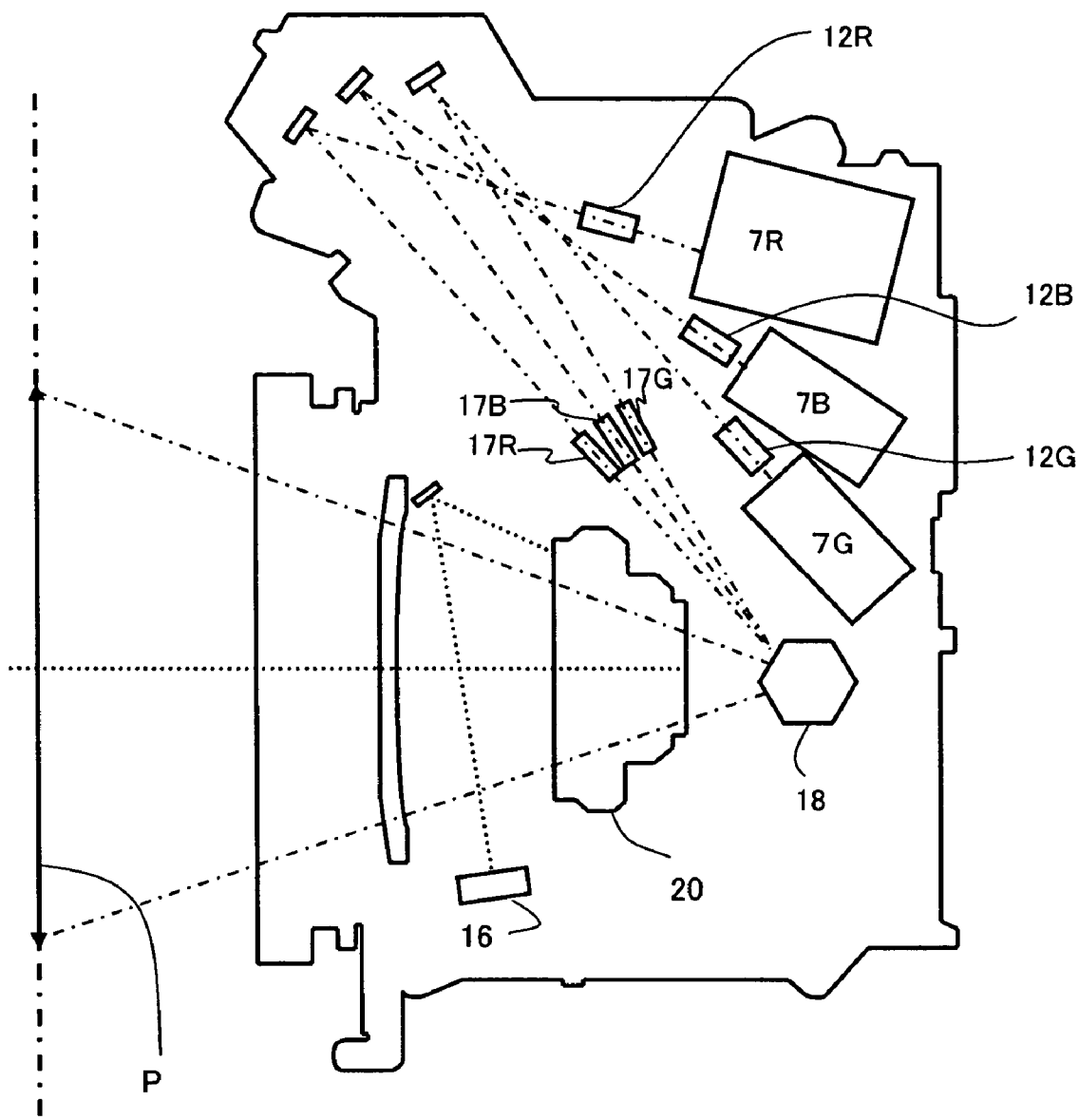
FIG. 6 is a view showing an arrangement of components in the image exposure apparatus of the present invention.

The blue color light source 7B is substantially identical in the arrangement to said green color light source 7G as comprising a blue color SHG laser unit 10B for emitting a blue color beam of laser, the AOM 12B, and the dimmer 13B aligned along the optical axis and also including the temperature adjusting unit and the control circuit. The AOMs 12G and 12B and the dimmers 13G and 13B all are arranged in the same manner as of said AOM 12R and said dimmer 13R provided in said red color light source 7R. Alternatively, the light sources 7R, 7G, and 7B may be arranged with the AOMs 12R, 12G, and 12B and the dimmers 13R, 13G, and 13B located outside of the light source units as shown in FIG. 6.

The beams of light emitted from the light source 7R, 7G, and 7B are directed through reflecting mirrors 14R, 14G, or 14B and cylindrical lenses 17R, 17G, and 17B respectively and received at different angles by one reflecting surface of the deflection optical systems 8, each of which comprises a polygonal mirror 18 and an fθ lens 20. Then, the beams of light are reflected at deflecting angles and fallen on a photosensitive material for scanning along the scanning lines at predetermined intervals for exposure of the photosensitive material.

The cylindrical lenses 17R, 17G, and 17B are arranged for converging the beams of reflected light from the reflecting mirrors 14R, 14G, and 14B on the one reflecting surface of the polygonal mirror 18 to compensate for a surface tilting error (with the normal of the surface dislocated from the correct center line) along the sub scanning direction on the reflecting surface of the polygonal mirror 18.

The polygonal mirror 18 is a column assembly having a polygonal shape in the cross section and a corresponding number of the reflecting surfaces provided at the lateral sides and can be driven by a polygonal mirror driver 19 for rotation at a constant angular speed. The beam of light reflected on one of the reflecting surfaces of the polygonal mirror 18 is deflected by the rotating action of the polygonal mirror 18 for scanning along the main scanning direction on the printed paper P. The beam of light is reflected from one surface to another of the polygonal mirror 18 so that its reflecting direction is shifted for scanning along the main scanning direction in the same range. This allows the beam of light to scan one full scanning line after reflected on one of the reflecting surfaces, whereby the time lag between any two adjacent scanning lines along the sub scanning direction can be minimized.

The fθ lens 20 is an optical system having a group of lenses for changing the length of the light path extending from the polygonal mirror 18 to the printed paper P to compensate for any distortion in a image developed substantially at both ends of the incident area of the beam of light on the printed paper P and for maintaining the scanning speed of the beam of light constant along the main scanning direction. The effective operating area of said fθ lens 20 is equal to the maximum range of exposure.

The single optical sensor unit 16 is located outside the scanning area on the printed paper P of the beam of light from the polygonal mirror 18 or outside of the light path extending from the deflection optical system 8 to the printed paper P as arranged for detecting the timing of start point synchronization for scanning actions of the three beams of light in red (R), green (G), and blue (B). Each beam of light reflected by the polygonal mirror 18 is then reflected by a reflecting mirror 21 and received by the optical sensor unit 16. The location of the optical sensor unit 16 is not limited to that in the embodiment but may be determined for the beam of light being detected by the optical sensor unit 16 directly not through the mirror 21, so long as the duration from the detection of the beam of light on the reflecting surface to the arrival at the printed paper P is successfully measured outside of the light path extending from the deflection optical system 8 to the printed paper P.

The printed paper P is conveyed at a constant speed in a direction perpendicular to the sheet, the sub scanning direction, by the action of a conveying mechanism 9 which includes conveying rollers 22 driven by a micro step motor 23 as accurately controlled with a control signal from a micro step driver 24. As the printed paper P being conveyed, its surface along the main scanning direction and the sub scanning direction is exposed to the light beam of the image data.

The construction and action timing of the controller 30 in the image exposure apparatus 6 will now be described referring to FIGS. 4 and 5. While a circuitry block is only illustrated containing the controller 30 and the AOM drivers 15R, 15G, and 15B, the action of the light sources 7R, 7G, and 7B and the polygonal mirror driver 19 is also controlled by the controller 30. It is also noted that all items related to the image data of the red (R), green (G), and blue (B) colors are accompanied with R, G, and B respectively and explained at minimum in FIG. 4 and the following description.

Figure 4:
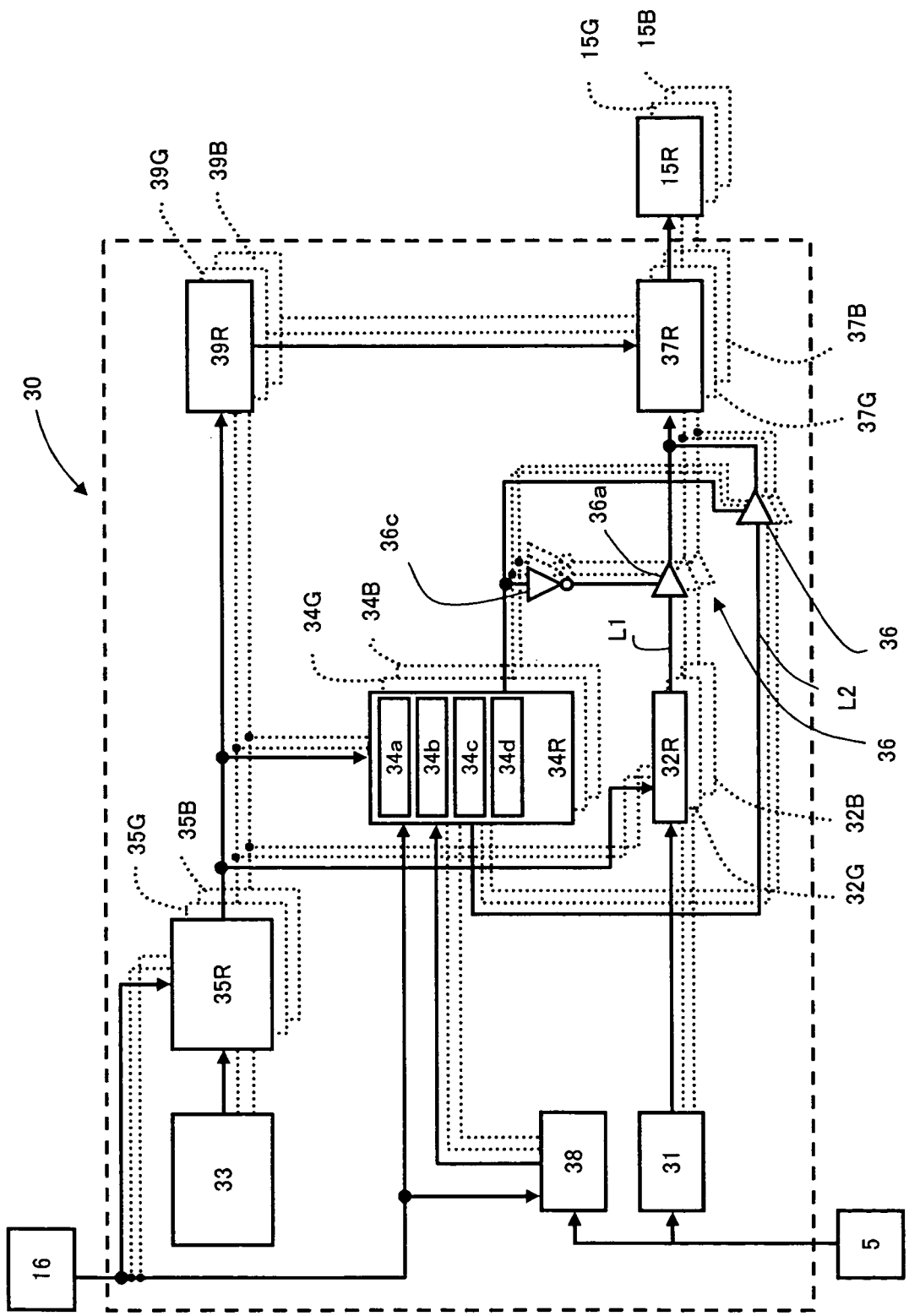
FIG. 4 is a circuitry block diagram of a controller provided in the image exposure apparatus of the present invention.
Figure 5:
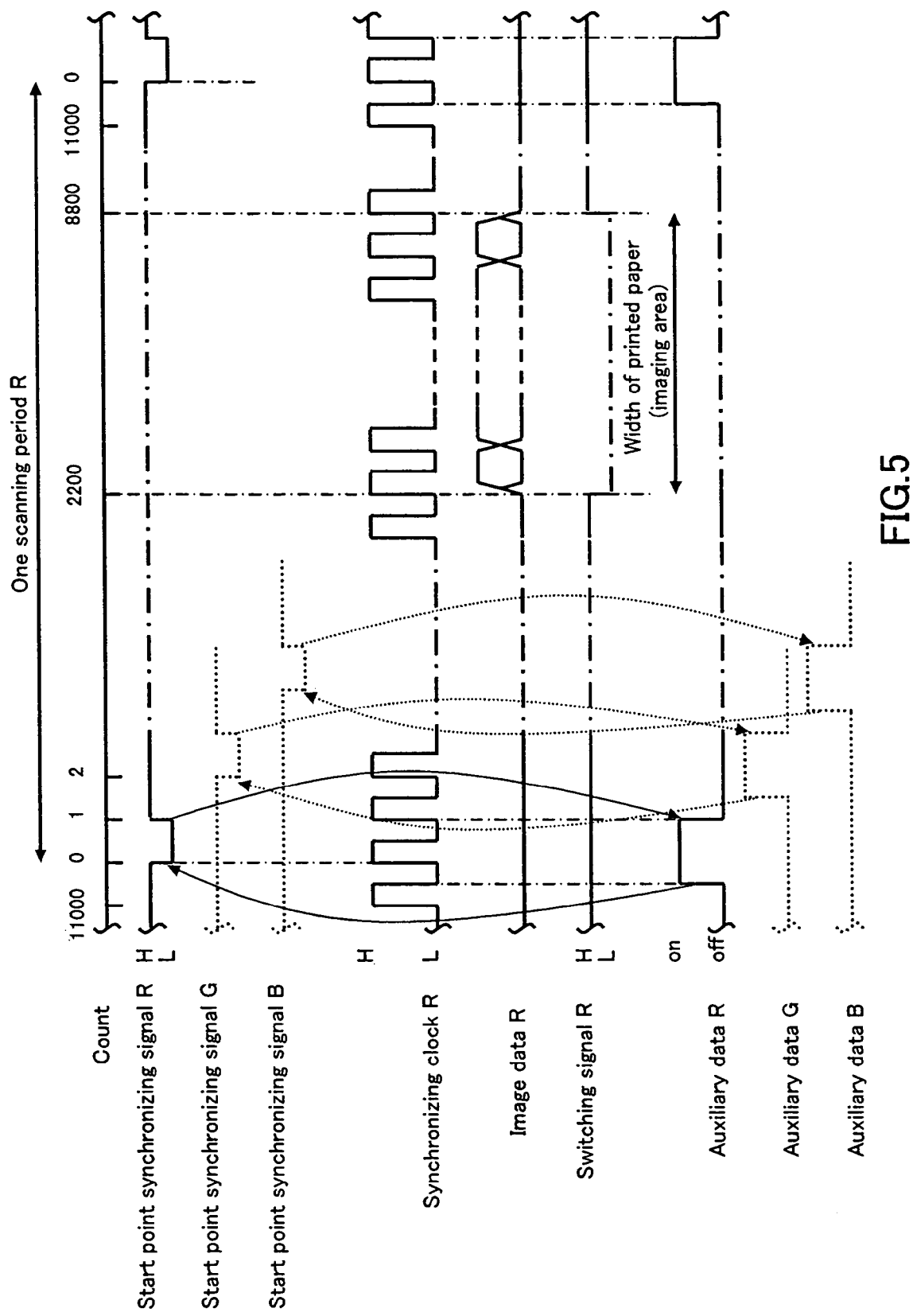
FIG. 5 is a timing chart showing various actions of the image exposure apparatus of the present invention.

As shown in FIG. 4, said controller 30 comprises a CPU 38, a frame memory 31 where the image data of the red (R), green (G), and blue (B) colors supplied from the computer 5 are saved, three line memories 32R, 32G, and 32B for temporarily saving each for one scanning line of the red (R), green (G), and blue (B) color image data received from the frame memory 31, a reference clock generating circuit 33 for determining the interval between pixels along the main scanning direction, three clock synchronizing circuits 35R, 35G, and 35B for timing reference clock outputs of the reference clock generating circuit 33 with the start point synchronizing signals for the red (R), green (G), and blue (B) color data detected by the optical sensor unit 16, three memory controllers 34R, 34G, and 34B, three selector switches 36R, 36G, and 36B, and three D/A converters 37R, 37G, and 37B.

In the exposure mode, the CPU 38 starts light source units 7R, 7G, and 7B as well as the polygonal mirror driver 19. As the light source units 7R, 7G, and 7B are actuated with the polygonal mirror 18 being rotated at a constant speed, components R, G, and B for each scanning line of the image data of an original image or its processed data received from the computer 5 and temporarily saved in the frame memory 31 are retrieved at given timing and saved in their respective line memories 32R, 32G, and 32B. The line memories 32R, 32G, and 32B contain address information for determining a sequence of pixel data along the main scanning direction. More specifically, the image data (referred to as "pixel data" hereinafter) saved in each address in said line memories 32R, 32G, and 32B are read out and transferred via the selector switches 36R, 36G, and 36B to the D/A converters 37R, 37G, and 37B by the action of the memory controllers 34R, 34G, and 34B.

For example, a digital form of the pixel data containing information of the gradation received from the line memory 32R is converted by the D/A converter 37R to an analog voltage ranging from zero to 1 V which is then applied to the AOM driver 15R for actuating the AOM 12R. Accordingly, the beams of laser emitted from the light sources 7R, 7G, and 7B are modulated by their respective AOMs 12R, 12G, and 12B corresponding to the pixel data received and deflected by the action of the deflection optical system 8 to scan the printed paper P for exposure.

Figure 7A:
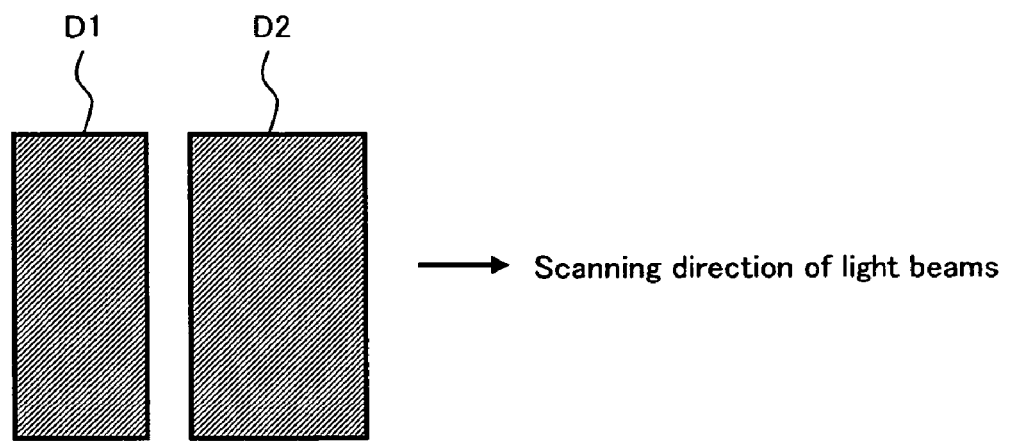
FIGS. 7A, 7B, and 7C are schematic diagrams showing the principles of the detecting action in the optical sensor unit.
Figure 7B:
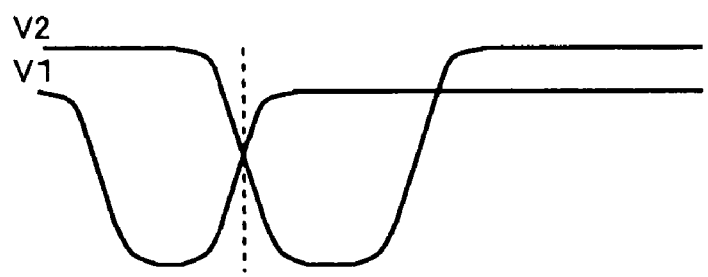
Figure 7C:
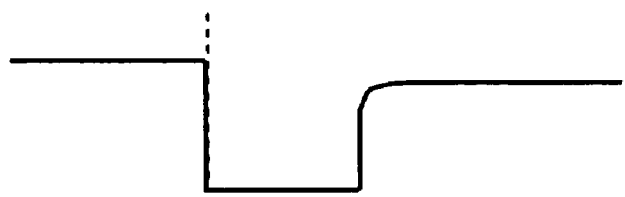

The optical sensor unit 16 generates the start point synchronization signal when detecting the beam of light of each color of red (R), green (G), and blue (B) immediately prior to the exposure of the printed paper P to the beam of light carrying the line data. It is assumed, as shown in FIG. 7A, that a two-separation sensor is used having the first photo receiver D1 and the second photo receiver D2 arranged at a very small distance therebetween along the main scanning direction. In action, when receiving the beam of light, the photo receivers D1 and D2 generate voltage outputs V1 and V2 respectively from the intensity of the received light which are lagged in time from each other as shown in FIG. 7B. The two voltage outputs V1 and V2 are then compared by a voltage comparator. When V2>V1, a high level of the start point synchronization signal is released and when V1>V2, a low level signal is released as shown in FIG. 7C. It is now noted that when the two outputs V1 and V2 are equal, the beam of light is at its correct direction regardless of its intensity. Accordingly, the start point synchronization signal for timing the scanning action of the beam of light at high accuracy regardless of the intensity can be produced.

The clock synchronizing circuits 35R, 35G, and 35B receive a constantly pulsed original clock signal from the reference clock generating circuit 33 and produce clock signals synchronized with the start point synchronization signal for the beam of light detected by the optical sensor unit 16. As are connected to the outputs of the clock synchronizing circuits 35R, 35G, and 35B respectively and to the optical sensor unit 16, the memory controllers 34R, 34G, and 34B produce control signals for controlling the reading of image data from the line memories 32R, 32G, and 32B, switching signals for controlling the action of the selector switches 36R, 36G, and 36B, and auxiliary data which replace the pixel data and are received by the D/A converters 37.

When the digital inputs are varied, the analog outputs of said D/A converters 37R, 37G, and 37B to be received by said AOM drivers 15R, 15G, and 15B respectively are also varied. The digital inputs to the D/A converters 37R, 37G, and 37B are timed by the synchronizing signal for updating. In common, the dock input to the D/A converters is cycled several times greater than the updating cycle of the data. The clock input is hence a multiplied clock of which the frequency is multiplied from the synchronizing clock by a frequency multiplier 39.

The memory controllers 34R, 34G, and 34B count at their counters 34a the clocks received from the clock synchronizing circuits 35R, 35G, and 35B and determine from the resultant count and the setting saved in their memories 34b the controls signals for controlling the retrieving of pixel data from the line memories 32R, 32G, and 32B. The count can be reset by the start point synchronizing signal received by said memory controllers 34R, 34G, and 34B. More specifically, the count can be reset at each scanning line.

Accordingly, the position of the beam of light for scanning is identified as determined in the effective scanning range by the count of each counter 34a.

The count for allowing the beam of red (R), green (G), or blue (B) light to locate at the start position for scanning on the printed paper P is saved as a setting in the memory 34b. The setting may be determined depending on the width or any other parameter of the printed paper P and modified, if desired, by the action of the CPU 38 connected with the memory controller 34 and commanded by the computer 5.

In response to the count and the setting, the memory controllers 34R, 34G, and 34B determine the timing for starting the reading of pixel data and actuate the line memories 32R, 32G, and 32B with their control signals for starting the reading action. The line memories 32R, 32G, and 32B are connected with the synchronizing clock signals of the corresponding clock synchronizing circuits 35R, 35G, and 35B. With the control signals having received for triggering the reading of pixel data, the reading of pixel data from the line memories 32R, 32G, and 32B is carried out in a sequence as timed by the synchronizing clock signals.

The memory controllers 34R, 34G, and 34B generate switching signals for controlling the action of the selector switches 36R, 36G, and 36B. Each of the selector switches 36R, 36G, and 36B comprises a couple of three-state buffers 36a and 36b. The three-state buffer 36a is controlled by an inverted form of the switching signal produced by an inverter 36c while the other three-state buffer 36b is controlled by a not inverted form of the switching signal. The switching of the selector switches 36R, 36G, and 36B is made between a data line L1 for connecting the pixel data from the line memories 32R, 32G, and 32B to the D/A converters 37R, 37G, and 37B respectively and a data line L2 for connecting auxiliary data from the memory controllers 34R, 34G, and 34B to the same. When the switching signal is at high level, the data line L1 for pixel data remains disconnected and the data line L2 for auxiliary data is connected. When the switching signal is at low level, the data line L2 for auxiliary data remains disconnected and the data line L1 for pixel data is connected.

The auxiliary data is a modulation data for driving said AOM driver 15 with the beam of light staying outside the imaging area but in the scanning range. The auxiliary data consists of a data for detecting the timing for start point synchronization which is preset at the initial connection of the power supply by an output level detecting means described later and a data for turning the beam of light off while the timing for start point synchronization is being not detected. The auxiliary data is saved in a built-in memory 34c of each of the memory controllers 34R, 34G, and 34B. At the timing when the beams of light are received by the optical sensor unit 16 for detecting the start point, the memory controllers 34R, 34G, and 34B release the auxiliary data while the beams of light remain not overlapped with each other for exposure action. During the other time than the timing when the beams of light are received by the optical sensor unit 16, the data is released for having the beams of light at zero level.

In more detail, the data saved in the built-in memory 34d in each of the memory controllers 34R, 34G, and 34B for detecting the timing for start point synchronization carries a timing data by which the beams of light to be detected by the optical sensor unit 16 are prevented from overlapping each other on the optical sensor unit 16. The auxiliary data for detecting the timing for start point synchronization is released only for a predetermined length of time from the point when the count determined by the counter 34a is identical to the setting data saved in the built-in memory 34d.

The memory controllers 34R, 34G, and 34B provides a high level of the switching signal during the scanning of the imaging area with the beams of light for discriminating the imaging area from the area other than imaging area. They provide a low level in the other duration than the scanning duration. The timing of releasing the switching signal as well as the control signals and the auxiliary signal is also determined by the setting of the count. Accordingly, three different types of the data; the auxiliary data for passing a desired intensity of the light to the D/A converters 37R, 37G, and 37B for detection of the start point, the auxiliary data for turning the beams of light off at the area other than the imaging area, and the pixel data at the imaging area, can selectively be obtained depending on the scanning location of the beams of light.

Although not illustrated, the startup of exposure action along the sub scanning direction can be timed and controlled by the action of the memory controllers 34R, 34G, and 34B. As the reference clock generating circuit is provided for corresponding to the pitch of exposure action along the sub scanning direction, its output clock is counted upon receiving a detection signal as a trigger input, which is indicative of the detection of the leading end of the printed paper, from a paper end detecting sensor located in said conveying mechanism 9. It is then judged that the timing of starting the exposure action is just when the count becomes equal to the setting time of the leading end of the printed paper arriving at the exposure position.

Figure 8:
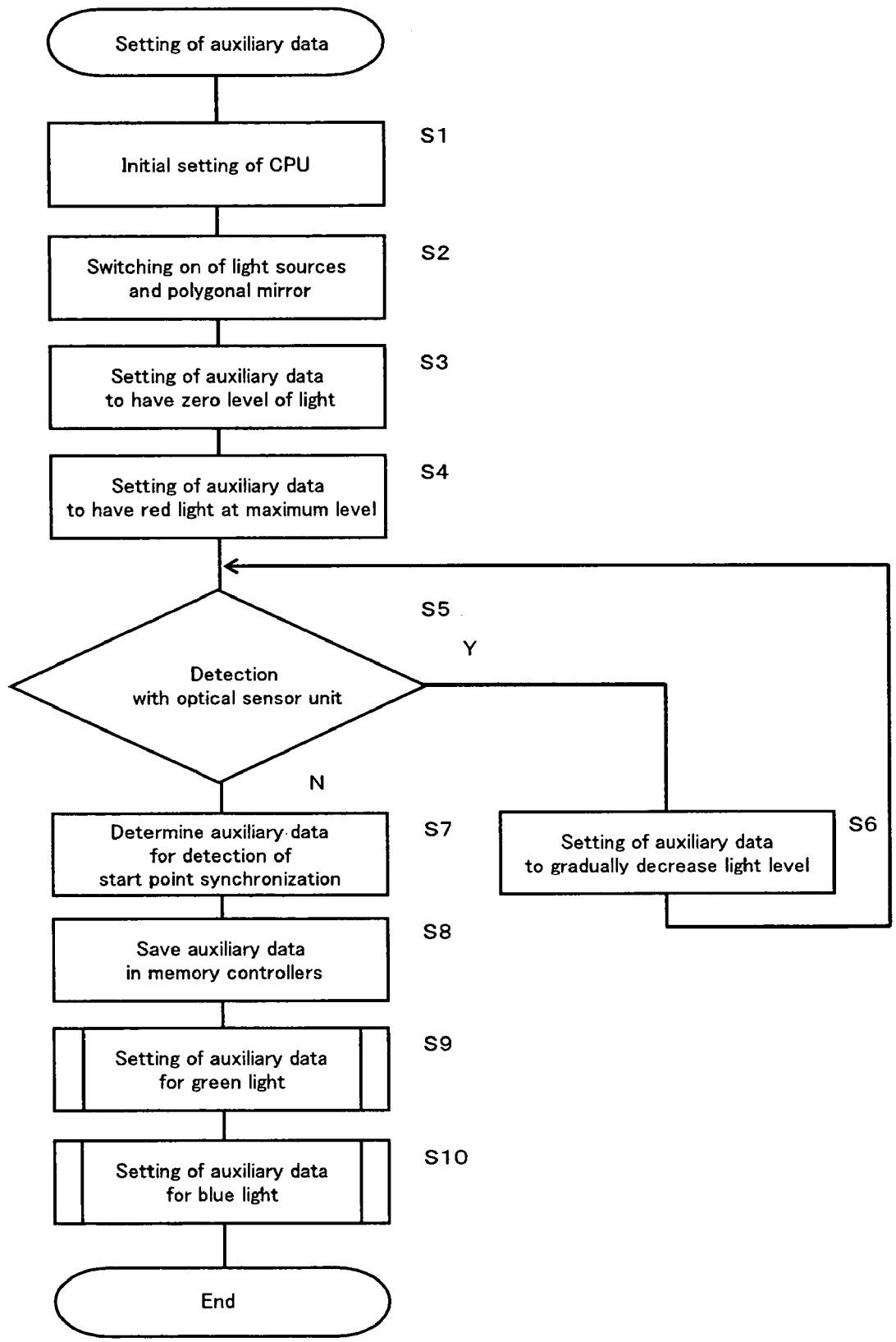
FIG. 8 is a flowchart illustrating the detecting action of the output level detecting means.
Figure 9:
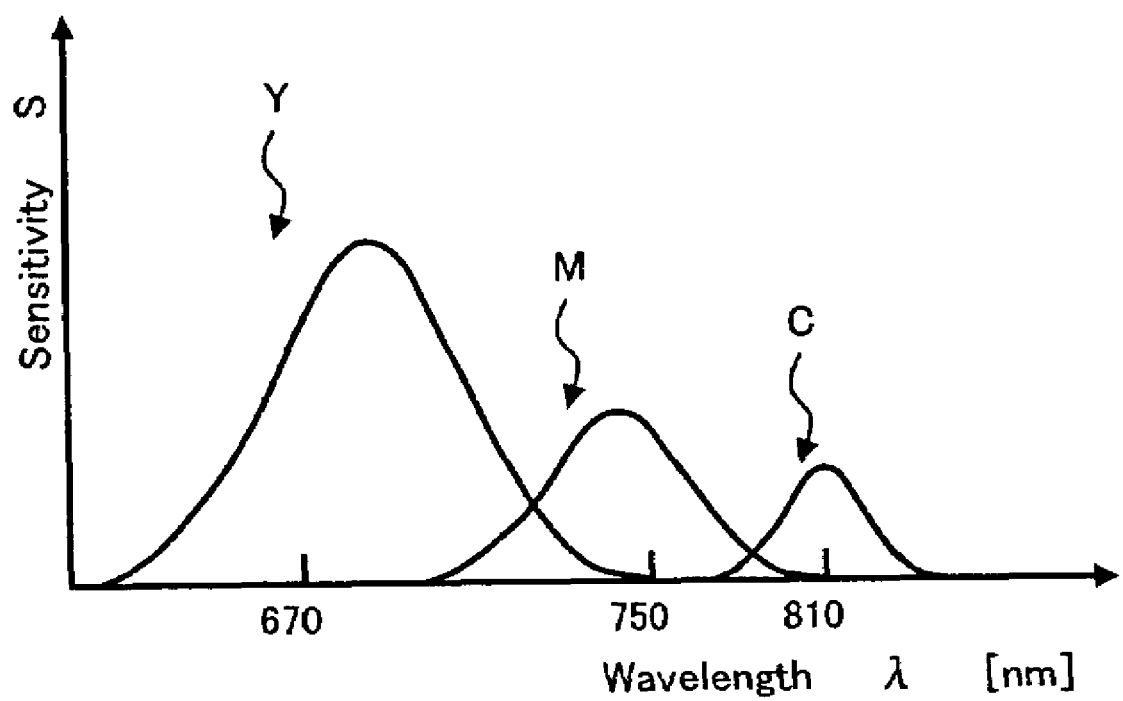
FIG. 9 is a spectral sensitivity profile of the photosensitive material.

The setting of the auxiliary data for detecting the timing of start point synchronization in the output level detecting means will now be explained referring to the flowchart shown in FIG. 8. When the digital photographic printer is switched on, its image exposure apparatus 6 is energized. This allows the CPU 38 to start its program action with initial setting of the built-in registers and memories (Step S1). Then, as the light sources 7R, 7G, and 7B and the polygonal mirror driver 19 are switched on, the beams of light are emitted with the polygonal mirror 18 being rotated (S2).

At the time, the memory controllers 34R, 34G, and 34B actuate the selector switches 36R, 36G, and 36B respectively for selectively conducting the data lines L2 to the D/A converters 37R, 37G, and 37B to deliver the auxiliary data for shifting the beams of light to zero (S3). Then, the CPU 38 provides the memory controller 34R for red color (R) light with the auxiliary data for the optical sensor unit 16 detecting the start point which is responsive to the highest beam of light. In turn, the memory controller 34R transfers the auxiliary data for detecting the start point for driving the AOM 15R (S4).

The CPU 38 receives the detection signal from the optical sensor unit 16 and examines whether the detection of the start point is correct or not (S5). When the detection of the start point is correct, the auxiliary data for gradually decreasing the intensity of light is released for driving the AOM 15R (S6). In this manner, the CPU 38 determines the minimum beam of light to be detected and adds it with a desired margin for setting the auxiliary data for detecting the start point (S7) and provides the memory controller 34R with the auxiliary data (S8). The steps from S5 to S7 may be carried out by the memory controller.

This is followed by carrying out the same actions as of the steps from S4 to S8 for the other memory controllers 34G and 34B (S9 and S10). As the auxiliary data for detecting the start point for the three beams of light in red (R), green (G), and blue (B) are set up, they are saved in the memory controllers 34R, 34G, and 34B respectively. To this end, the CPU 38 and the memory controllers 34R, 34G, and 34B constitute discrete processing blocks as the output level detecting means.

As mentioned above, with the selector switches 36R, 36G, and 36B selectively connected for conducting the data lines L1 to transmit the pixel data from the line memories 32R, 32G, and 32B to the D/A converters 37R, 37G, and 37B respectively, the first modulating means for modulating the output level of the beams of light along the light path for exposure in accordance with the pixel data are established by the memory controllers 34R, 34G, and 34B, the line memories 32R, 32G, and 32B, the D/A converters 37R, 37G, and 37B, and the AOM drivers 15R, 15G, and 15B. Similarly, when the selector switches 36R, 36G, and 36B are selectively connected for conducting the data lines L2 to transmit the auxiliary data from the memory controllers 34R, 34G, and 34B to the D/A converters 37R, 37G, and 37B respectively, the second modulating means for modulating the beams of light to a higher level outside of the light path for exposure than the level detected by the output level detecting means are established by the memory controllers 34R, 34G, and 34B, the line memories 32R, 32G, and 32B, the D/A converters 37R, 37G, and 37B, and the AOM drivers 15R, 15G, and 15B.

More particularly in the image exposure apparatus of this invention, the beam of light emitted from each light source is examined by the output level detecting means for determining its detectable level which can be detected by the optical sensor unit and then modulated by the second modulating means to a higher level than the level detected by the output level detecting means before directed to the deflection optical system. This permits the optical sensor unit to correctly detect the timing for start point synchronization for each of the light sources. Then, the beams of light are modulated with the pixel data across the light path for exposure by the first modulating means before focused on the photosensitive material for exposure.

The beam of light emitted from each light source remains not largely varied in the output level within a short period of time, provided that the compensation against the environmental conditions, including a temperature compensation, has been applied. Once the beams of light from the light source are set to a desired output level by the output level setting means at the beginning of the operation, the second modulating means maintains the level of the beams of light and the timing for start point synchronization can thus be detected correctly. It is therefore unnecessary to actuate the output level setting means at every exposure action.

For this reason, although the output level setting means described above is adapted for actuating upon the connection to the power supply, it may be modified to start before the photosensitive material enters the light path for exposure during the exposure action. In the latter case, for example, the beams of light emitted from the light sources can properly be adjusted at every exposure action on, e.g., a sheet of printed paper for correctly providing the start point synchronization, hence improving the operational reliability.

In addition, a self-diagnosing means may be provided for determining that the image exposure apparatus has a fault if any beam of light is not detected by said optical sensor unit 16 during either the operation of the output level detecting means or the action of start point synchronization with the second modulating means. This is followed by pausing the exposure action and displaying the fault on an operation panel of the digital photographic printer to avoid any undesired consumption of the photosensitive material with abnormal printed outputs.

For example, the normal printing action is interrupted when the optical sensor unit fails to detect the beam of light which has been increased in the output level by the action of the output level detecting means or when the timing for start point synchronization is hardly determined due to no beam of light detected during the operation of the second modulating means, because of no expectation for normal operation. Those cases can be found as faults by the self-diagnosing means. The self-diagnosing means may be implemented by the CPU 38, its execution program, and its peripheral circuitry components.

Figure 10:
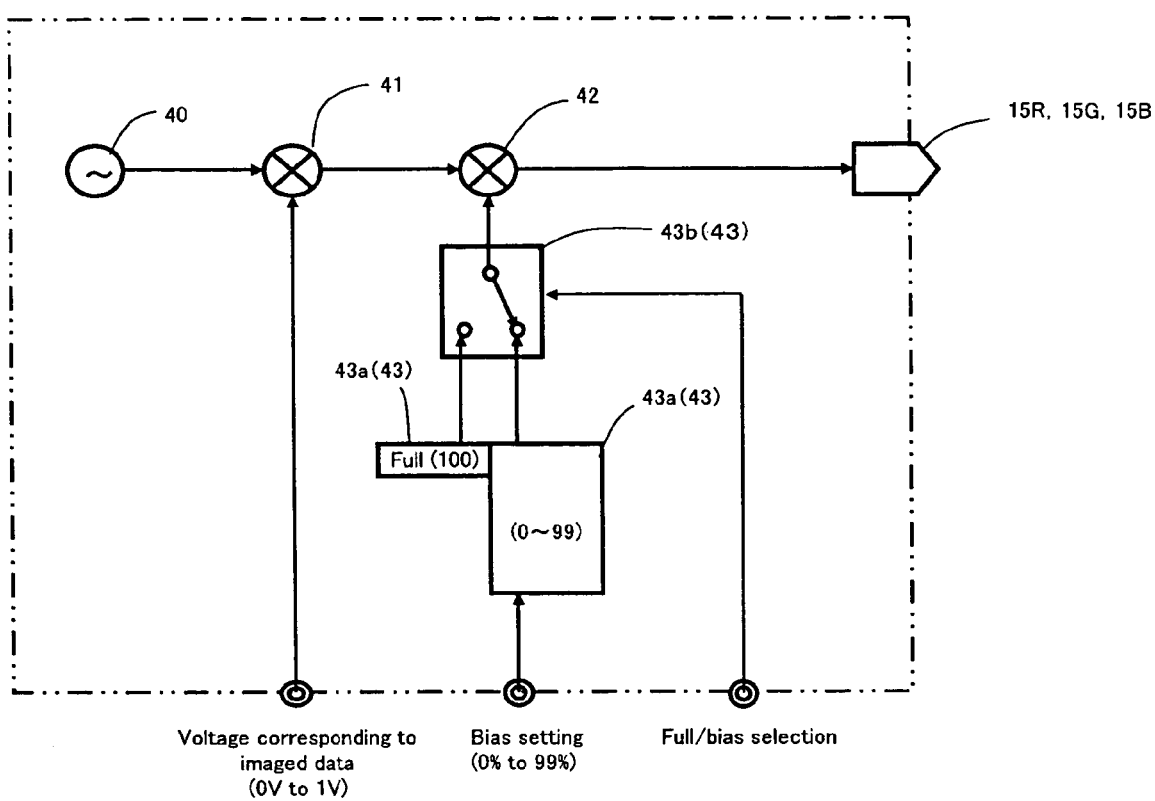
FIG. 10 is a schematic view of an AOM driver circuit.
Figure 11:
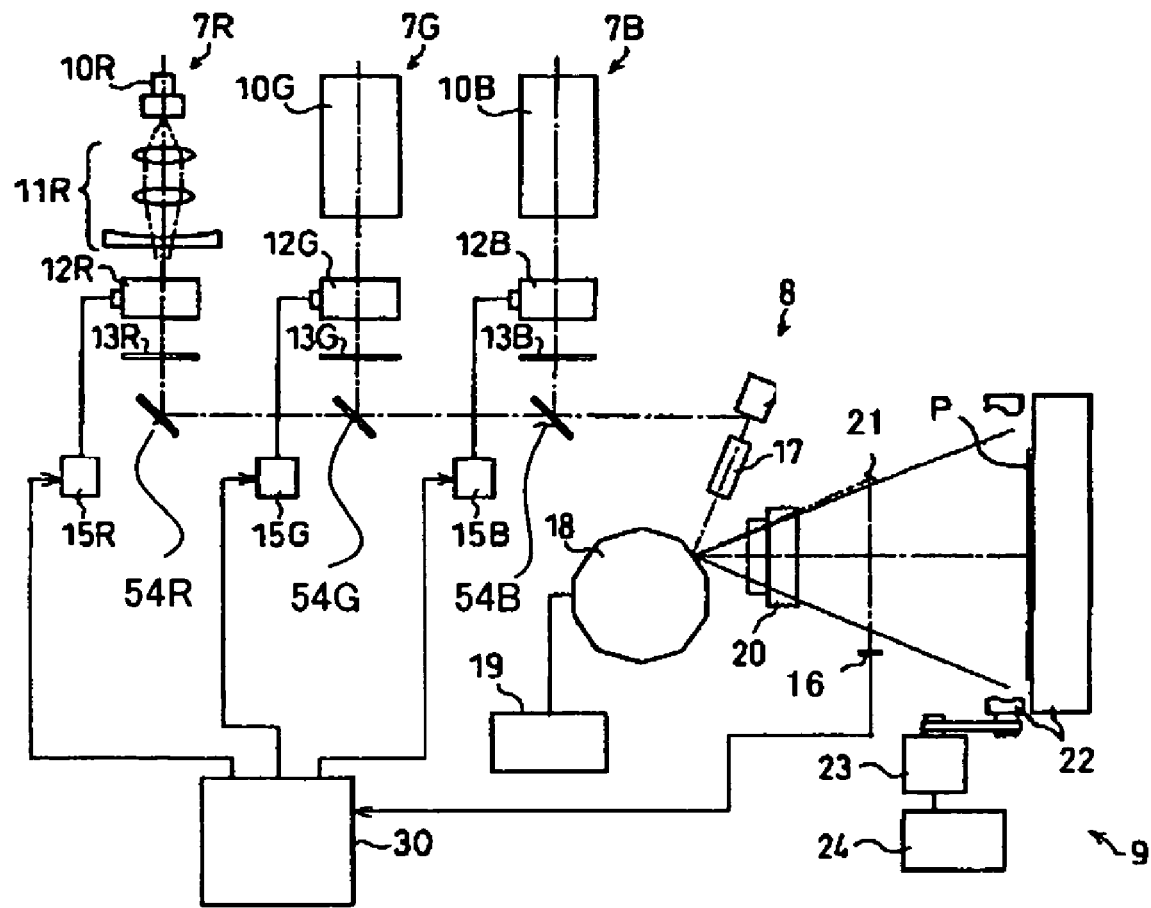
FIG. 11 is a schematic view of the image exposure apparatus of a conventional type where light beams are combined to a signal beam with the use of wave combining prisms.

Another modification of the interface between the D/A converters 37R, 37G, and 37B and the AOM drivers 15R, 15G, and 15B will be explained. As shown in FIG. 10, each of the AOM drivers 15R, 15G, and 15B is accompanied with a modulating circuit which comprises a high-frequency signal oscillator 40, a first multiplier 41 for modulating the amplitude of a voltage output of the oscillator 40 with the output of the corresponding D/A converter 37R, 37G, or 37B based on the image data or the auxiliary data, a second multiplier 42 for variably modulating the voltage output of the first multiplier 41 at steps by one percent between 0% to 100%, and a modulation degree switching circuit 43 for determining the degree of the modulation in the second multiplier 42. This allows the beams of light to be set to a higher level at the beginning of the operation than that at the exposure action, hence improving the detection of the timing for start point synchronization.

The modulation degree switching circuit 43 may comprise an electronic volume control 43a for changing the degree of the modulation between 0% and 99% and a selector switch 43b for selecting the modulation between the setting determined by the electronic volume control 43a or the 100% level. In a common modulating action for providing the image data, the degree of modulation is set to preferably 50% by the modulation degree switching circuit 43. Accordingly, the voltage output of the D/A converter ranging from 0 V to 1 V is modulated between 0 V and 0.5 V before delivered to the AOM driver. In a modulating action with the auxiliary data for start point synchronization, the voltage output of the D/A converter ranging from 0 V to 1 V is modulated between 0 V and 1 V. As a result, the beams of light can be increased to a higher level than the maximum at the common exposure action. The action of the modulation degree switching circuit 43 selectively determining the degree of modulation may be controlled by the memory controllers.

The arrangement of the controller 30 described above is illustrative but not of limitation. The controller 30 may be embodied using known circuitry components for providing the same functions. Also, three identical controllers may separately be provided for corresponding to the three colors, red (R), green (G), and blue (B), of light.

According to the embodiment, the auxiliary data is contemplated with the output level detecting means operating for having the beams of light increased to a higher level regardless of the intensity of light during the exposure action in order to ease the optical sensor unit 16 detecting the timing for start point synchronization. It may be modified for the same purpose to provide a sensitivity setting means for setting the detection sensitivity of the optical sensor unit 16 to a higher level than the minimum for detecting the beams of light at a reference level such that the output level or intensity of each light beam is modified to the reference level during the operation of the second modulating means. The sensitivity setting means may preferably be embodied with the gain of an amplifier for amplifying the output of the optical sensor unit 16 arranged selectable and, if necessary, shifted to a desired setting for providing an optimum of the sensor output. The reference level may be equal to the maximum intensity determined by the first modulating means or its approximate or a higher level.

Since the detection sensitivity of the optical sensor unit 16 is set to a higher level than the level corresponding to the minimum detectable level of the beams of light by the sensitivity setting means, the timing for start point synchronization can correctly be determined with the beams of light received at a minimum level.

It may also be modified to have a sensitivity setting means for selectively shifting the detection sensitivity of the optical sensor unit 16 to a higher level than the minimum for detecting the beams of light at a reference level during the above-mentioned second modulating means and select the optimum sensitivity of the optical sensor unit 16 during the action of detecting the timing for start point synchronization.

This allows the detection sensitivity of the optical sensor unit 16 to be selectively set to an optimum level corresponding to the output level of the beams of light to be detected, hence determining the timing for start point synchronization correctly within a range of the sensitivity variations.

The detection sensitivity to be set by the sensitivity setting means may be at a higher level than the minimum for detecting the intensity of light at the connection to the power supply. Alternatively, the detection sensitivity may be shifted to a higher level than the minimum for detecting the beams of light at a reference level when the photosensitive material is not present across the light path for exposure during the common exposure action. The reference level may be equal to the maximum determined by the first modulating means or its approximate or a higher level.

While the AOMs are used for modulating the beams of light in the embodiment, they may be replaced by, e.g., electro-optic modulators. (EOM) or magneto-optic modulators (MOM) with equal success in the modulation of the intensity of laser light.

Although the modulators such as AOMs are used for varying the output level of the beams of light in the embodiment, they may be omitted but the driving currents for energizing semiconductor lasers or photodiodes used as the light sources may be utilized for modulating directly the output level.

It is moreover possible for embodying the present invention that the components described for eliminating the problems are assembled in any appropriate combination.

As apparent from the above description, the image exposure apparatus of the present invention is provided with a different angle input optical system, in which the arrangement of the light sources has a degree of design freedom so as to minimize the overall size and eliminate a troublesome adjusting step in the assembling process while the beams of light can successfully be detected without a plurality of optical sensor units.

What is claimed is:

1. An image exposure apparatus comprising:
    a group of light sources for emitting at different angles beams of light which are different in the narrow band wavelength from each other;
    a deflection optical system for reflecting and deflecting the beams of light received at one reflecting surface in the main scanning direction and scanning in a sequence at predetermined intervals along each scanning line for exposure of a photosensitive material;
    a single optical sensor unit located outside of the light path for exposure extending from said deflection optical system to the photosensitive material for providing the timing for start point synchronization of each of the beams of light individually along said main scanning direction;
    an output level detecting device detecting the output level of each beam of light detectable with the optical sensor unit;
    a first modulating device modulating the output level of each of the beams of light with pixel data along the light path for exposure;
    a second modulating device modulating the output level of each of the beams of light to a higher level outside of the light path for exposure than a measurement of the output level detected by the output level detecting device; and
    a self-diagnosing device judging a fault when said optical sensor unit fails to detect any of the beams of light during the action of at least one of said output level detecting device and said second modulating device.

2. An image exposure apparatus comprising:
    a group of light sources for emitting beams of light which are different in narrow band wavelengths from each other;
    a deflection optical system for reflecting and deflecting the beams of light received at different angles by one reflecting surface of said deflection optical system in the main scanning direction and scanning in a sequence at predetermined intervals along each scanning line for exposure of a photosensitive material;
    a single optical sensor unit located outside of the light path for exposure extending from said deflection optical system to the photosensitive material for providing the timing for start point synchronization of each of the beams of light individually along said main scanning direction;
    an output level detecting device detecting the output level of each beam of light detectable with the single optical sensor unit;
    a first modulating device modulating the output level of each of the beams of light with pixel data along the light path for exposure;
    a second modulating device modulating the output level of each of the beams of light to a higher level outside of the light path for exposure than a measurement of the output level detected by the output level detecting device; and
    a self-diagnosing device judging a fault when said optical sensor unit fails to detect any of the beams of light during the action of at least one of said output level detecting device and said second modulating device.

* * * * *